(12) United States Patent
Ohmoto et al.

(10) Patent No.: US 8,899,370 B1
(45) Date of Patent: Dec. 2, 2014

(54) CASING FOR HOUSING OCCUPANT PROTECTION DEVICE CONTROL UNIT

(71) Applicant: Honda Motor Co., Ltd., Tokyo (JP)

(72) Inventors: Takahiro Ohmoto, Wako (JP); Kenyu Okamura, Wako (JP); Takahiro Ishikawa, Wako (JP); Shinya Ueki, Wako (JP); Tomoya Yoshikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/291,071

(22) Filed: May 30, 2014

(30) Foreign Application Priority Data

May 31, 2013 (JP) .................................. 2013-116084

(51) Int. Cl.
*B60T 7/22* (2006.01)

(52) U.S. Cl.
USPC .......................................................... 180/274

(58) Field of Classification Search
USPC ............... 180/274, 271; 280/728.2; 220/4.02; 361/752, 736, 670.02, 730, 759; 174/535, 541; 439/34, 76.1
See application file for complete search history.

(56) References Cited

U.S. PATENT DOCUMENTS

| 7,510,404 B2 * | 3/2009 | Koyama | ........................ 439/76.1 |
| 8,096,576 B2 | 1/2012 | Azuma | |
| 8,414,013 B2 * | 4/2013 | Koyama | ........................ 280/727 |

FOREIGN PATENT DOCUMENTS

JP 2010-83382 A 4/2010

* cited by examiner

*Primary Examiner* — Faye M. Fleming
(74) *Attorney, Agent, or Firm* — Westerman, Hattori, Daniels & Adrian, LLP

(57) ABSTRACT

A casing for housing an occupant protection device control unit is mounted to a vehicle body. The casing is composed of a metallic base mounted on the vehicle body with its plate surfaces facing upward and downward, respectively, and a main body that is put on and mounted on the base. The base has a lock portion that is deformable according to a deformation of the vehicle body caused by a collision load from a vehicle front. The lock portion, when deformed, causes a front portion of the base to be locked with at least a part of a front wall of the main body.

4 Claims, 6 Drawing Sheets

FIG. 3
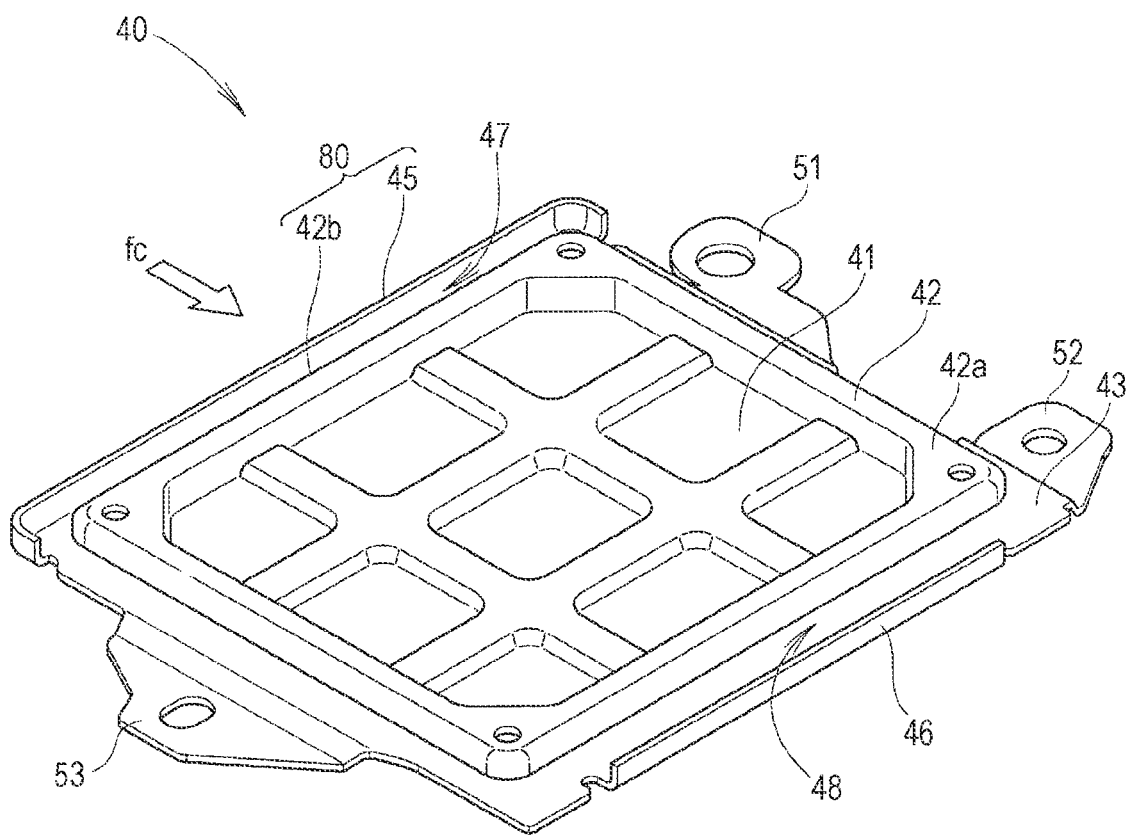
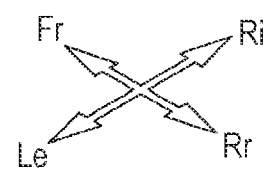

CASING FOR HOUSING OCCUPANT PROTECTION DEVICE CONTROL UNIT

CROSS REFERENCES TO RELATED APPLICATIONS

The present application claims priority under 35 U.S.C. §119 to Japanese Patent Application No. 2013-116084, filed May 31, 2013, entitled "Casing for Housing Occupant Protection Device Control Unit." The contents of this application are incorporated herein by reference in their entirety.

TECHNICAL FIELD

The present disclosure relates to a casing for housing an occupant protection device control unit which houses an occupant protection device control unit for installation to a vehicle body.

BACKGROUND

An occupant protection system installed in a vehicle uses an acceleration sensor to detect that the vehicle has been subjected to a collision load from a vehicle front and cause an occupant protection device control unit to control the occupant protection system in accordance with a detection signal from the acceleration sensor. The occupant protection device control unit is a unit that is housed in a casing and installed in the front section of the vehicle body. Some of occupant protection device control units have an acceleration unit integrated thereinto, which are called a sensor integrated type. Integration of sensors allows the simplification of, for example, a signal system of the occupant protection system. Such a casing that houses an occupant protection device control unit is known by, for example, Japanese Unexamined Patent Application Publication No. 2010-083382.

The casing for an occupant protection device control unit known by Japanese Unexamined Patent Application Publication No. 2010-083382 is composed of a resin-made main body having its bottom surface opened and a cover that covers the bottom surface of the main body. A substrate for the occupant protection device control unit is secured to the main body with screws, together with the cover located below the substrate.

The main body has a plurality of brackets formed thereon in an integral manner. Each of the brackets is mounted on a vehicle body. A collision load to which the vehicle body is subjected is transmitted from the vehicle body to the main body through the brackets and to the substrate through the screws and then to an acceleration sensor installed in the substrate.

The inventors found the followings. It is preferable that the collision load is transmitted from the vehicle body to the acceleration sensor as directly as possible without the resin-made main body in a transmission path in order to allow the collision load to be transmitted to the acceleration sensor more quickly and exactly. To that end, it is conceivable that the cover is changed to a metallic base and only the base is installed to the vehicle body. If the metallic base is used, the brackets formed on the main body are not required.

However, the metallic base must bear a great burden since it is fully subjected to a collision load. In addition, the base must protect the occupant protection device control unit housed in the casing from an excessive collision load. Use of, for example, a thicker base would be a solution for ensuring the rigidity of the base, but it would have a disadvantage in reducing weight and cost of the casing.

SUMMARY

The present application describes a technique for reducing the weight and cost of a casing for housing an occupant protection device control unit.

According to a first aspect of the embodiment, a casing for housing an occupant protection device control unit and being mounted to a vehicle body is preferably composed of a metallic base mounted on the vehicle body with its plate surfaces facing upward and downward, respectively, and a main body that is put on and mounted on the base, wherein the base has a lock portion that is deformable according to a deformation of the vehicle body caused by a collision load from a vehicle front and wherein the lock portion, when deformed, causes a front portion of the base to be locked with at least a part of a front wall of the main body. With this arrangement, the collision load can be dispersed in the front portion of the base to the front wall of the main body. This reduces a load to which the base is subjected, allowing the implementation of the base having a lower rigidity. Accordingly, the weight and cost of the casing can be reduced by, for example, thinning the base. Also, the base has only the lock portion, which helps prevent the casing from growing in size. Furthermore, the dispersion of the collision load in the front portion of the base to the front wall of the main body limits the deformation of the base and the main body. This enhances the performance for protecting the occupant protection device control unit housed in the casing against the collision load. The occupant protection device control unit has various important data stored therein. Such enhanced protection of the occupant protection device control unit ensures that the various data are read out from the occupant protection device control unit.

According to a second aspect of the embodiment, the lock portion is preferably composed of front and rear extension portions each extending upward from a front portion of the base, wherein the front extension portion is located so as to cover at least a part of the front wall of the main body from a vehicle front, and wherein the rear extension portion and the front extension portion are located so as to be able to longitudinally put the front wall of the main body therebetween. This configuration allows the front portion of the base to be locked with at least a part of the front wall of the main body. The lock portion is simple and compact because the front and rear extension portions just extend upward from the front portion of the base.

According to a third aspect of the embodiment, the main body of the casing is preferably provided with a waterproof cover that covers the front extension portion from top to a front face. The waterproof cover prevents water from entering the casing when the main body is exposed to water.

BRIEF DESCRIPTION OF THE DRAWINGS

The advantages of the disclosure will become apparent in the following description taken in conjunction with the following drawings.

FIG. 3 is a perspective view of a base shown in FIG. 2.

DETAILED DESCRIPTION

An embodiment according to the present disclosure is described below with reference to the attached drawings.

A casing for housing an occupant protection device control unit according to an embodiment of the present disclosure is described below with reference to the attached drawings. Reference to "front", "rear", "left", "right", "top" or "bottom" side of the vehicle is relative to an operator's position in a driver's seat, while "Fr", "Rr", "Le", and "Ri" refer to a vehicle front, rear, left, and right side, respectively.

Figure 1:
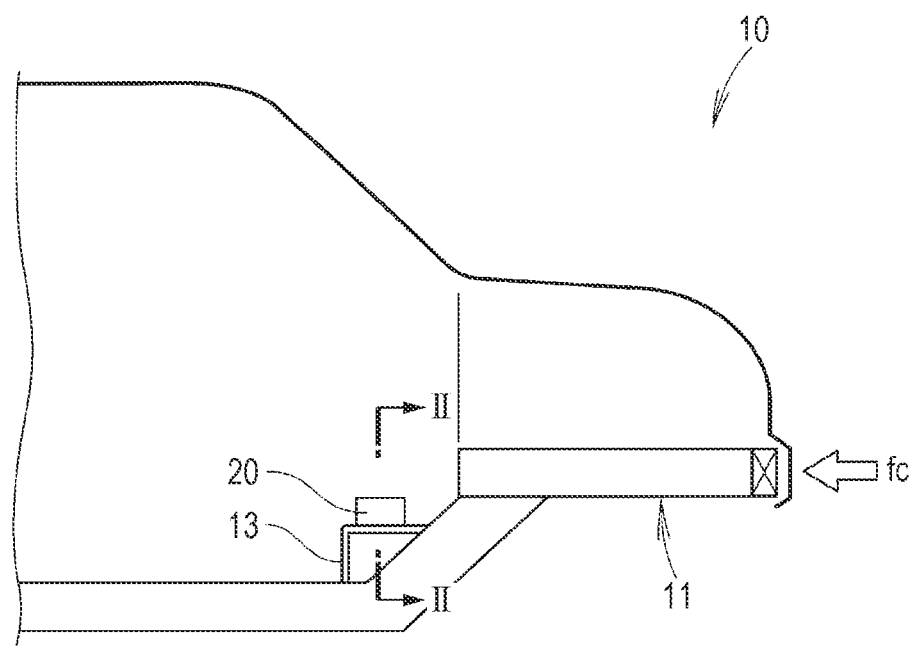
FIG. 1 is a schematic side view showing a front section of a vehicle provided with a casing for housing an occupant protection device control unit according to an embodiment of the present disclosure.
Figure 2:
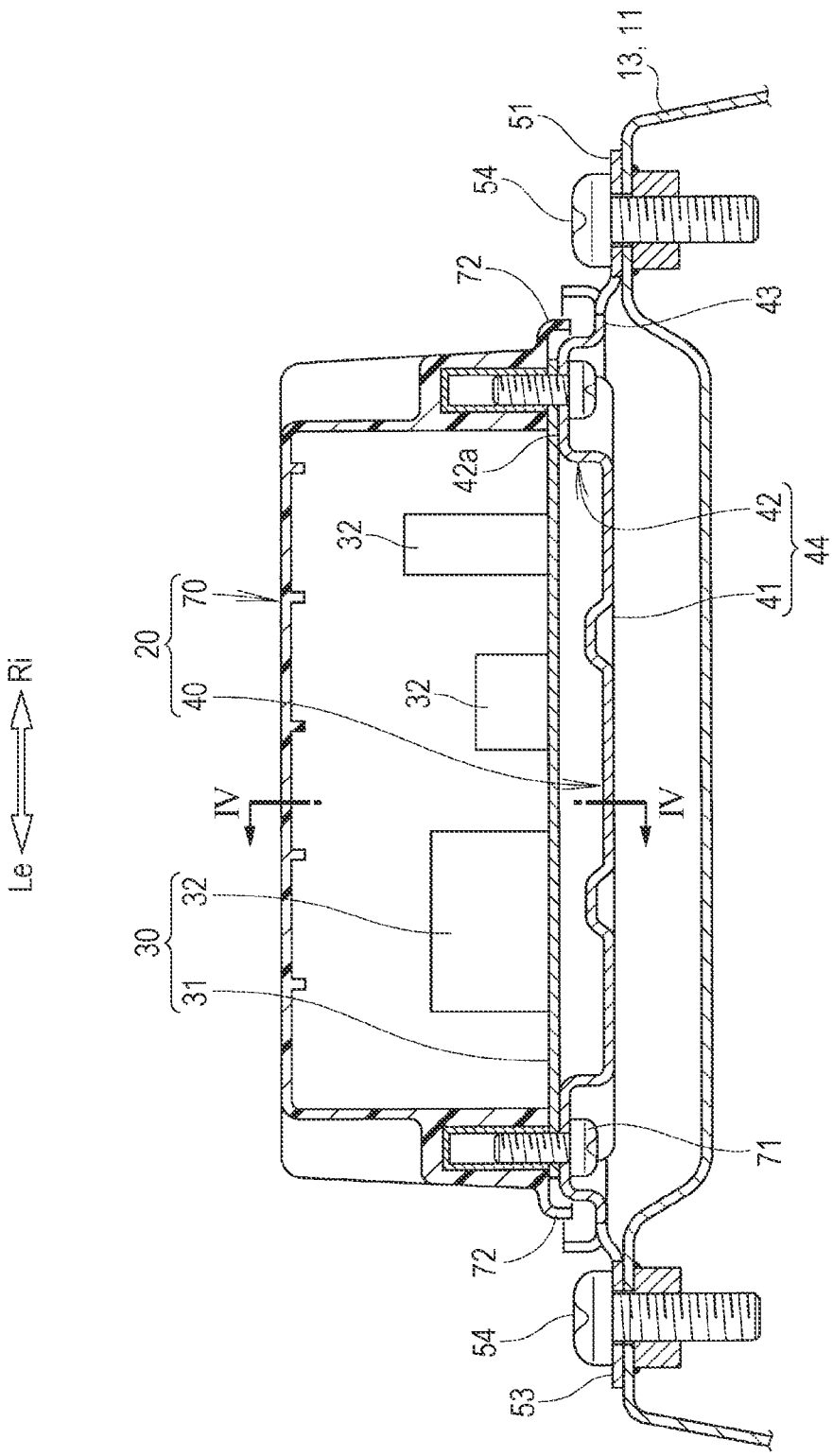
FIG. 2 is a sectional view taken along line II-II of FIG. 1.

As shown in FIG. 1, a vehicle body 11 of a vehicle 10 like a motor vehicle has a casing mounting bracket 13 provided at a front portion thereof or, for example, a front end of a floor tunnel thereof. The front portion of the vehicle body 11, namely, the casing mounting bracket 13 has a casing 20 provided thereon. A front portion of the casing 20 is directed toward the front of the vehicle 10. As shown in FIG. 2, the casing 20 is a casing in which an occupant protection device control unit 30 or a cluster of electronic components 32 is housed.

The occupant protection device control unit 30 is composed of a substrate 31 like a printed circuit board and the cluster of electronic components 32 mounted on the substrate 31. The occupant protection device control unit 30 is a unit that controls an occupant protection system when the vehicle 10 is subjected to a collision load, including an acceleration sensor for detecting that the vehicle has received the collision load. In other words, the acceleration sensor is included as a part of the electronic components 32.

The casing 20 is composed of a metallic base 40 mounted on the vehicle body with its plate surfaces facing upward and downward, respectively, and a resin-made main body 70 of the casing 20 that is put on and mounted on the upper side (plate surface) of the base 40. The base 40 is a folding molded component made of, for example, light alloy, such as aluminum alloy, or steel plate or a light alloy die-cast component that is substantially rectangular in plan view, and substantially plate-like.

More specifically, the base 40, as shown in FIGS. 2 and 3, is an integral molding consisting of a flat center section 41 that is substantially rectangular in plan view, a frame section 42 that surrounds the center section 41, and a flat edge section 43 that surrounds the frame section 42. The frame section 42 extends upward from an edge of the center section 41 and has its upper end surface 42a formed to have a flat surface. The upper end surface 42a is parallel to the center section 41.

The edge section 43 is formed to be parallel to and be leveled with the center section 41. The edge section 43 has a vertical plate-like front wall 45 (front extension part 45) formed at a front end thereof, which extends upward from the entire extent of the front end. Also, the edge section 43 has a vertical plate-like rear wall 46 formed at a rear end thereof, which extends upward from the entire extent of the rear end. A front groove 47 is provided between a front end of the frame section 42 and the front wall 45. Also, a rear groove 48 is provided between a rear end of the frame section 42 and the rear wall 46. As to the height of the front wall 45 and the rear wall 46, the front wall 45 and the rear wall 46 are leveled with an upper end surface 42a of the frame section 42.

The base 40 has a plurality of brackets 51, 52, 53 extending laterally from an end thereof. More specifically, the brackets 51, 52, 53 extend laterally from an edge of the base 40, namely, an lateral end of the edge section 43 and are formed integrally with the base 40. The brackets 51, 52, 53 include a first bracket 51 located at a lateral end (one lateral end) on a right front portion of the base 40, a second bracket 52 located at a lateral end on a right rear portion of the base 40, and a third bracket 53 located at a lateral end on a left portion of the base 40, each of which is secured to the vehicle body 11 with bolts 54 (including a screw).

A main body 70 of the casing 20 is composed of a resin molding, such as a hard resin molding. The main body 70 is formed in a substantially rectangular shape in plan view, which is large enough to cover the entire part of the center section 41 and the frame section 42 from above, and has its entire bottom surface opened. The main body 70 is overlaid on the upper end surface 42a of the frame section 42 with the substrate 31 therebetween and secured to the frame section 42 from below together with the substrate 31 with screws 71.

In other words, the casing 20 is composed of the main body 70 having its bottom opened and the base 40 that covers the bottom surface of the main body 70. The substrate 31 is secured to the main body 70 with the screws 71, together with the base 40 located therebelow.

The main body 70 has a skirt 72 formed integrally therewith at its bottom edge, which extends downward along its entire circumference. The skirt 72 covers the entire outer circumference of the frame section 42. With this arrangement, the main body 70, even when exposed to water from above, prevents water from entering the upper end surface 42a of the frame section 42. The substrate 31 is housed inside the casing 20 to protect from exposure to water from the outside.

In addition, each of the front groove 47 and rear groove 48 has the skirt 72 put thereinto from above. For this reason, in particular, the front and rear sides of the casing 20 are configured to be water-proof through the grooves 47, 48 and the skirt 72, thereby more providing a water-proof performance.

Figure 4:
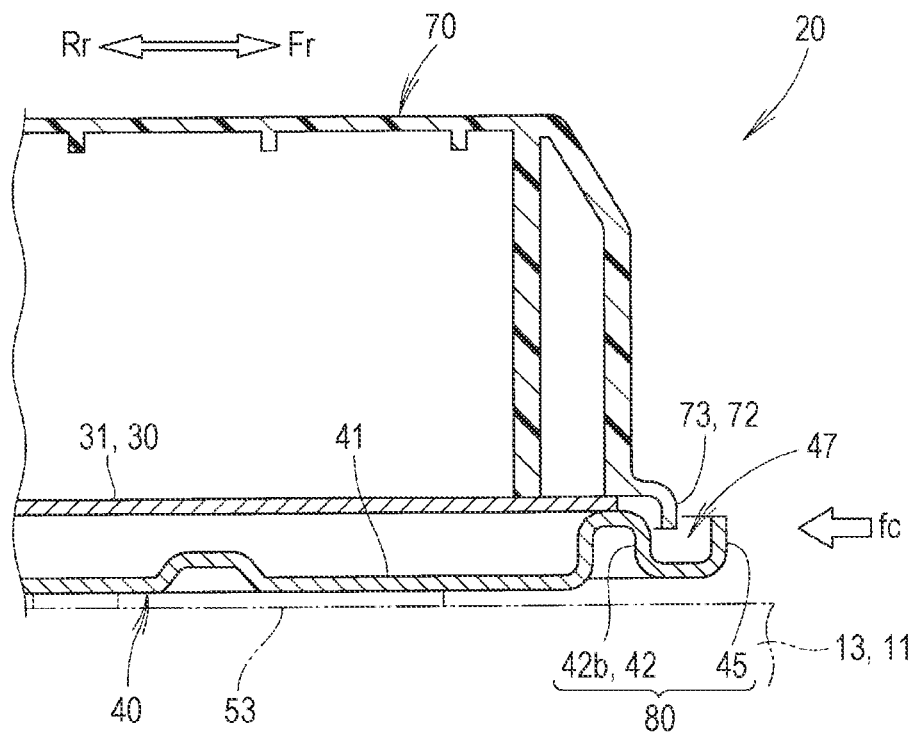
FIG. 4 is a sectional view showing a front half part of a casing, taken along line IV-IV of FIG. 2.

As shown in FIG. 4, the base 40 has a lock portion 80 that is deformable according to a deformation of the vehicle body 11 caused by a collision load fc from a vehicle front. The lock portion 80, when deformed, causes a front end of the base 40 to be locked with at least a part of a front wall 73 of the main body 70. The front wall 73 of the main body 70 is composed of, for example, a front portion of the skirt 72.

The lock portion 80 is composed of the front wall 45 extending upward from a front end surface of the edge section 43 in the base 40 and a front portion 42b of the frame section 42 in the base 40. The front wall 45 is referred to as "front extension portion 45 extending upward from a front portion of the base 40". The front portion 42b in the frame section 42 is referred to as "rear extension portion 42b extending upward from a front portion of the base 40".

In other words, the lock portion 80 is composed of the front and rear extension portions 45, 42b extending upward from a front portion of the base 40. The front extension portion 45 is located so as to cover at least a part of the front wall 73 of the main body 70 from a vehicle front. The rear extension portion 42b and the front extension portion 45 are located so as to be able to longitudinally put the front wall 73 of the main body 70 therebetween.

Figure 5:
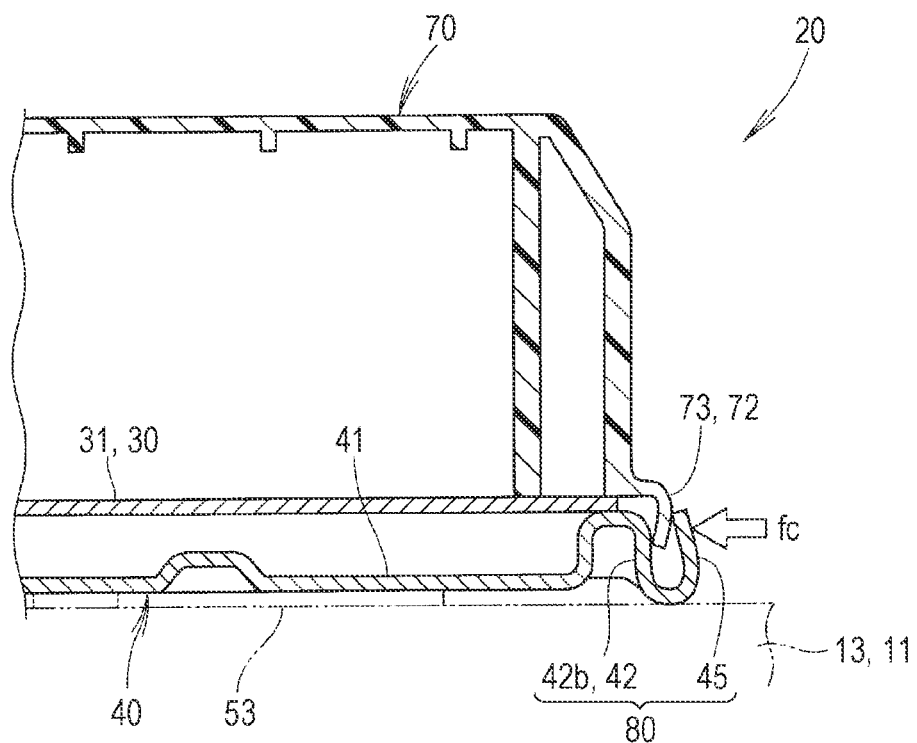
FIG. 5 is an explanatory drawing illustrating a state where a lock portion is locked in a casing shown in FIG. 4.

As shown in FIG. 5, the lock portion 80, when deformed by a collision load fc, causes a front end of the base 40 to be locked with at least a part of the front wall 73 of the main body 70, thereby allowing the collision load fc to be dispersed from the front end of the base 40 to the front wall 73 of the main body 70. This reduces a burden to which the base 40 is subjected, allowing the implementation of the base 40 having lower rigidity. Accordingly, the weight and cost of the casing 20 can be reduced by, for example, thinning the base 40. Also, the base 40 has only the lock portion 80, which helps prevent the casing 20 from growing in size.

Furthermore, the dispersion of the collision load fc in the front end of the base 40 to the front wall 73 of the main body 70 limits the deformation of the base 40 and the main body 70. This enhances the performance for protecting the occupant protection device control unit 30 (see FIG. 2) housed in the casing 20 against the collision load fc. The occupant protection device control unit 30 has various important data stored therein. Such enhanced protection of the occupant protection device control unit 30 ensures that the various data are read out from the occupant protection device control unit 30.

The lock portion 80 puts the front wall 73 of the main body 70 between the front and rear extension portions 45, 42b extending upward from the front portion of the base 40 and thereby locks the front end of the base 40 with at least a part of the front wall 73 of the main body 70. The lock portion 80 is simple and compact because the front and rear extension portions 45, 42b just extend upward from the front portion of the base 40.

Figure 6:
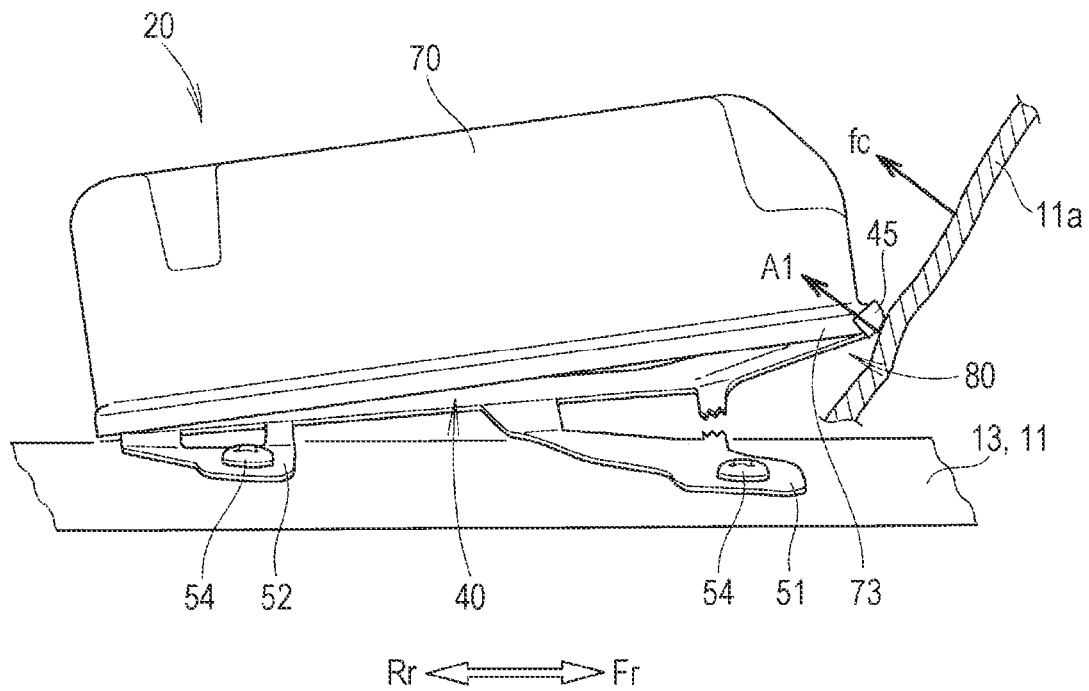
FIG. 6 is an explanatory drawing illustrating a state in which a floor panel comes into contact with a casing shown in FIG. 5 from a lower front of a vehicle.

Next, the effect of the above arrangement is described below. As shown in FIG. 6, if part of a front section of the vehicle body 11 or, for example, a portion 11a in the floor panel which is just in front of the casing 20 is subjected to a rearward and upward plastic deformation resulting from an excessive collision load fc from below a vehicle front, the portion 11a comes into contact with the front extension portion 45 in the base 40. As a result, the front extension portion 45 bends rearward, thereby causing the lock portion 80 to lock the front end of the base 40 with the front wall 73 of the main body 70 (see FIG. 5). The collision load fc is dispersed from the front end of the base 40 to the front wall 73 of the main body 70. The portion 11a further deforms and presses the front extension portion 45 of the base 40 in the rearward and upward direction (indicated by arrow A1 of FIG. 6), thereby causing the first bracket 51 to be torn off. This protects the occupant protection device control unit 30 (see FIG. 2) in the casing against the collision load fc.

Figure 7:
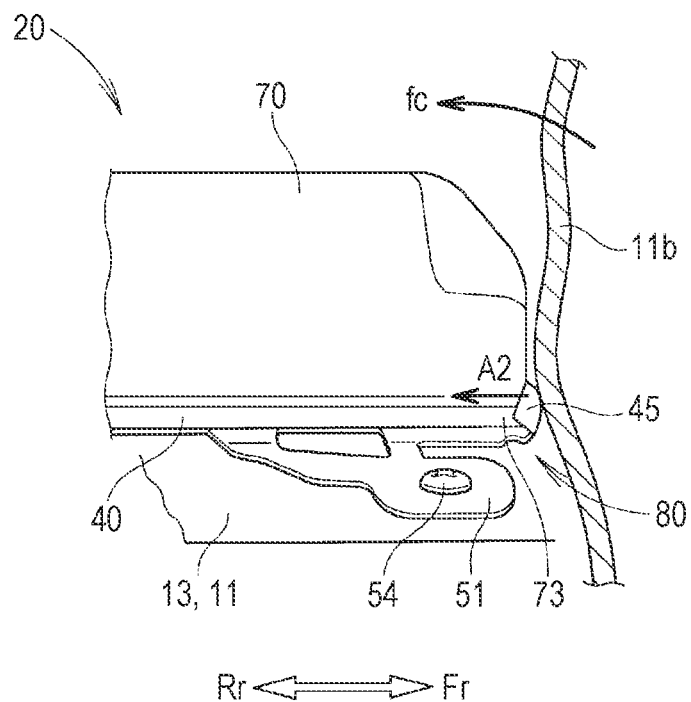
FIG. 7 is an explanatory drawing illustrating a state in which a floor panel comes into contact with a casing shown in FIG. 5 from a vehicle front.

As shown in FIG. 7, if part of a front section of the vehicle body 11 or, for example, an entire portion 11a in the floor panel which is close to the casing 20 is subjected to an excessive collision load fc from a vehicle front and suffers from rearward and upward plastic deformation, the portion 11a comes into contact with the front extension portion 45 of the base 40. As a result, the front extension portion 45 bends rearward, thereby causing the lock portion 80 to lock the front end of the base 40 with the front wall 73 of the main body 70 (see FIG. 5). The collision load fc is dispersed from the front end of the base 40 to the front wall 73 of the main body 70. The portion 11a further deforms and presses the front extension portion 45 of the base 40 in the rearward direction (indicated by arrow A2 of FIG. 7), thereby causing the first bracket 51 to be deformed or torn off. This protects the occupant protection device control unit 30 (see FIG. 2) in the casing against the collision load fc.

Figure 8:
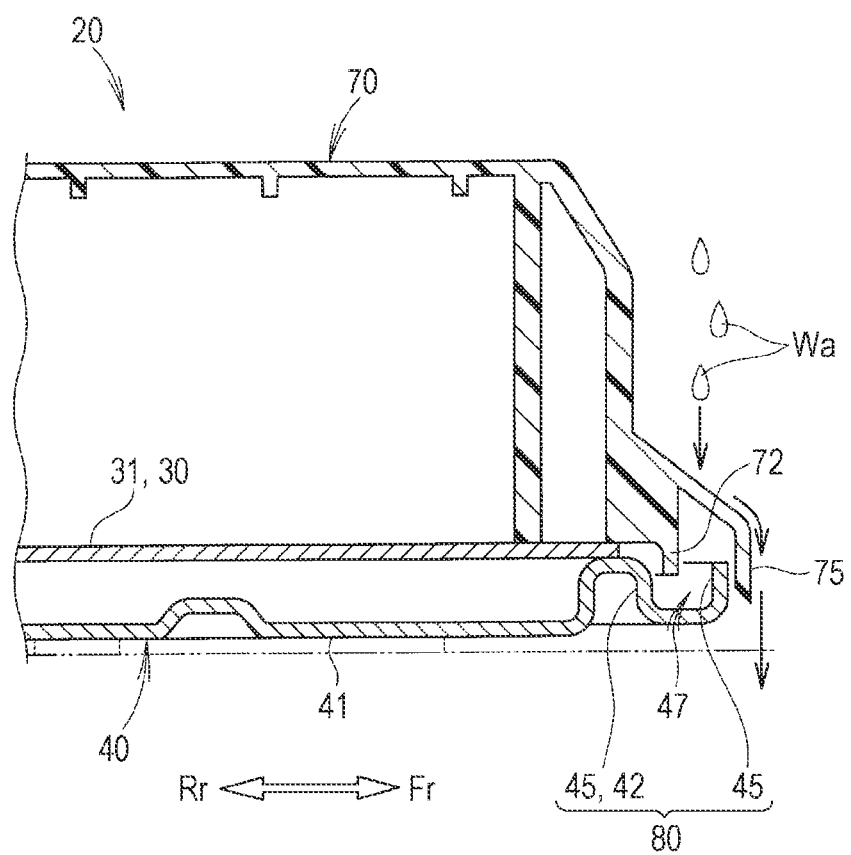
FIG. 8 is a view showing an example of a modified front half part of a casing shown in FIG. 4.

FIG. 8 shows an example of modifications to the main body 70. The main body 70 has a waterproof cover 75 that covers the front extension portion 45 from top to a front face. The waterproof cover 75 prevents water Wa from entering the casing 20 when the main body 70 is exposed to water Wa.

The casing 20 according to the present disclosure is suitable for use in the casing for housing the occupant protection device control unit 30 provided with an acceleration sensor. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A casing for housing an occupant protection device control unit, the casing being mounted to a vehicle body, the casing comprising:
    a plate shape metallic base mounted on the vehicle body having an upper surface facing upward and a lower surface facing downward, the base including a front portion located closer to a front of the vehicle body; and
    a main body mounted on the upper surface of the base, the main body including a front wall located closer to the front of the vehicle body,
    wherein the base includes a lock portion deformable according to a deformation of the vehicle body caused by a collision load from a vehicle front, and the lock portion, when deformed, causes the front portion of the base to be locked with at least a part of the front wall of the main body.

2. The casing for housing the occupant protection device control unit according to claim 1, wherein the lock portion comprises a first extension portion and a second extension portion, each extending upward from the front portion of the base, the first extension portion being located in front of the second extension portion,
    wherein the first extension portion is located so as to cover at least a part of a front surface of the front wall of the main body, and
    wherein the front wall of the main body is interposed between the first extension portion and the second extension portion.

3. The casing for housing the occupant protection device control unit according to claim 2, wherein the main body includes a waterproof cover covering a top surface and a front surface of the first extension portion.

4. The casing for housing the occupant protection device control unit according to claim 2, wherein the lock portion has a substantial U shape in cross section including the first extension portion, the second extension portion, and a bottom wall connecting between the first extension portion and the second extension portion.

* * * * *